(12) United States Patent
Takifuji et al.

(10) Patent No.: US 9,371,188 B2
(45) Date of Patent: Jun. 21, 2016

(54) BELT UNIT AND IMAGE FORMING APPARATUS

(71) Applicants: Kotaro Takifuji, Nagoya (JP); Wataru Yamaguchi, Nisshin (JP)

(72) Inventors: Kotaro Takifuji, Nagoya (JP); Wataru Yamaguchi, Nisshin (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 189 days.

(21) Appl. No.: 13/846,093

(22) Filed: Mar. 18, 2013

(65) Prior Publication Data

US 2014/0001013 A1 Jan. 2, 2014

(30) Foreign Application Priority Data

Jun. 27, 2012 (JP) .................................. 2012-144308

(51) Int. Cl.
| | |
|---|---|
| G03G 15/16 | (2006.01) |
| B65G 15/60 | (2006.01) |
| B41J 2/00 | (2006.01) |
| B41J 11/00 | (2006.01) |
| G03G 15/01 | (2006.01) |
| G03G 15/00 | (2006.01) |

(52) U.S. Cl.
CPC . B65G 15/60 (2013.01); B41J 2/00 (2013.01); B41J 11/007 (2013.01); G03G 15/0189 (2013.01); G03G 15/1615 (2013.01); G03G 15/6529 (2013.01); *G03G 2215/00143* (2013.01)

(58) Field of Classification Search
CPC ............ G03G 15/161; G03G 15/1615; G03G 15/162; G03G 2215/0138; G03G 2215/1623
USPC ................... 399/302, 303; 198/806, 837, 840
See application file for complete search history.

(56) References Cited

U.S. PATENT DOCUMENTS 5,017,969 A * 5/1991 Mitomi et al. ................ 399/299
8,032,051 B2 * 10/2011 Takiguchi et al. ............ 399/101

FOREIGN PATENT DOCUMENTS

| JP | S60-143604 A | | 7/1985 |
|---|---|---|---|
| JP | H08-194248 A | | 7/1996 |
| JP | 2008-170478 A | | 7/2008 |
| JP | 2008170478 A | * | 7/2008 |
| JP | 2009-008917 A | | 1/2009 |

OTHER PUBLICATIONS

Mar. 8, 2016—(JP) Notification of Reasons for Rejection—App 2012-144308.

* cited by examiner

*Primary Examiner* — Erika J Villaluna
(74) *Attorney, Agent, or Firm* — Banner & Witcoff, Ltd.

(57) ABSTRACT

A belt unit including an endless belt, a first roller, a second roller, and a guiding member is provided. The guiding member includes a groove, in which a guided section of the endless belt is set, and the groove includes a first face and a second face. The first face is formed to have a first parting line extending in a direction to intersect with a central axis. The first face includes a first part in a frontward range and a second part in a rearward range with respect to the first parting line along a rotating direction of the guiding member. The first face has a first gap between the first part and the second part to form the first part in a position closer to the second face with respect to the second part.

17 Claims, 9 Drawing Sheets

BELT UNIT AND IMAGE FORMING APPARATUS

CROSS REFERENCE TO RELATED APPLICATION

This application claims priority from Japanese Patent Application No. 2012-144308, filed on Jun. 27, 2012, the entire subject matter of which is incorporated herein by reference.

BACKGROUND

1. Technical Field

An aspect of the present invention relates to a belt unit including an endless belt and an image forming apparatus with the belt unit.

2. Related Art

A belt unit, in which a strained endless belt strip rolls around a pair of roller, has often been used in, for example, an image forming apparatus. The belt unit may include the belt strip being an endless belt and a guided part, which is arranged at one of widthwise ends of the belt strip to protrude inward from the belt strip. The guided part may be engaged with a groove formed in a rotatable guiding member, which is arranged at one of axial ends along an axial direction of each roller. With the guided part guided in the groove, the endless belt may be prevented from drifting in the axial direction of the rollers.

While an image forming apparatus may be equipped with the belt unit with the endless belt, if the endless belt unsteadily drifts in the axial direction, quality of an image formed in the image forming apparatus may be lowered.

SUMMARY

The guiding member with the groove may be often made by, in view of reduction of manufacturing cost, molding. In molding, however, a molded item may have a linear burr or tier called a parting line at a position corresponding to edges of divided faces of the molds.

Generally, in molding, a filler material such as resin is filled in a hollow space formed by two or more pieces of mold pattern, and the mold patterns are separated apart to unmold the solidified resin piece. Therefore, when the guiding member with the groove is unmolded, the mold patterns may be moved along an unmolding direction, i.e., along a direction orthogonal to a central axis of the rotatable guiding member.

The divided faces of the mold patterns may lie orthogonally with respect to the unmolding direction. Therefore, a parting line appearing in lateral sides of the groove may be formed in a shape of a flange expanding along the direction orthogonal to the central axis and the unmolding direction. In other words, the parting line in the lateral sides may lie along a radial direction of the guiding member.

When the parting line is formed along the radial direction in the groove, the widthwise end of the endless belt may collide with the parting line regularly while the guiding member rotates, and the endless belt may be damaged by the collision.

The present invention is advantageous in that a belt unit and an image forming apparatus, in which an endless belt can be prevented from being damaged by a parting line, are provided.

According to an aspect of the present invention, a belt unit is provided. The belt unit includes an endless belt including a belt strip and a guided section, the guided section protruding from an inner circumferential surface of the belt strip at one of widthwise sides along a widthwise direction of the belt strip; a first roller and a second roller, around which the endless belt is strained; and a guiding member made of resin and arranged on one of axial-end sides of the first roller along an axial direction of the first roller coaxially with the first roller, the guiding member being rotatable and formed to have a groove, in which the guided section is set. The groove includes a first face and a second face, which face each other along a direction in parallel with a central axis. The first face of the groove is arranged in a position closer to the one of widthwise sides with respect to the second face along the direction in parallel with the central axis and is formed to have a first parting line extending in a direction to intersect with the central axis. The first face includes a first part in a frontward range with respect to the first parting line along a rotating direction of the guiding member and a second part in a rearward range with respect to the first parting line along the rotating direction of the guiding member. The first face is formed to have a first gap between the first part and the second part to form the first part in a position closer to the second face with respect to the second part.

According to another aspect of the present invention, an image forming apparatus including an image forming unit configured to form an image on a sheet, and a belt unit is provided. The belt unit includes an endless belt including a belt strip and a guided section, the guided section protruding from an inner circumferential surface of the belt strip at one of widthwise sides along a widthwise direction of the belt strip; a first roller and a second roller, around which the endless belt is strained; and a guiding member made of resin and arranged on one of axial-end sides of the first roller along an axial direction of the first roller coaxially with the first roller, the guiding member being rotatable and formed to have a groove, in which the guided section is set. The groove includes a first face and a second face, which face each other along a direction in parallel with a central axis. The first face of the groove is arranged in a position closer to the one of widthwise sides with respect to the second face along the direction in parallel with the central axis and is formed to have a first parting line extending in a direction to intersect with the central axis. The first face includes a first part in a frontward range with respect to the first parting line along a rotating direction of the guiding member and a second part in a rearward range with respect to the first parting line along the rotating direction of the guiding member. The first face is formed to have a first gap between the first part and the second part to form the first part in a position closer to the second face with respect to the second part.

DETAILED DESCRIPTION

Hereinafter, an embodiment of the present invention will be described with reference to the accompanying drawings. It is noted that various connections are set forth between elements in the following description. These connections in general, and unless specified otherwise, may be direct or indirect, and this specification is not intended to be limiting in this respect.

1. Overall Configuration of Image Forming Apparatus

Figure 1:
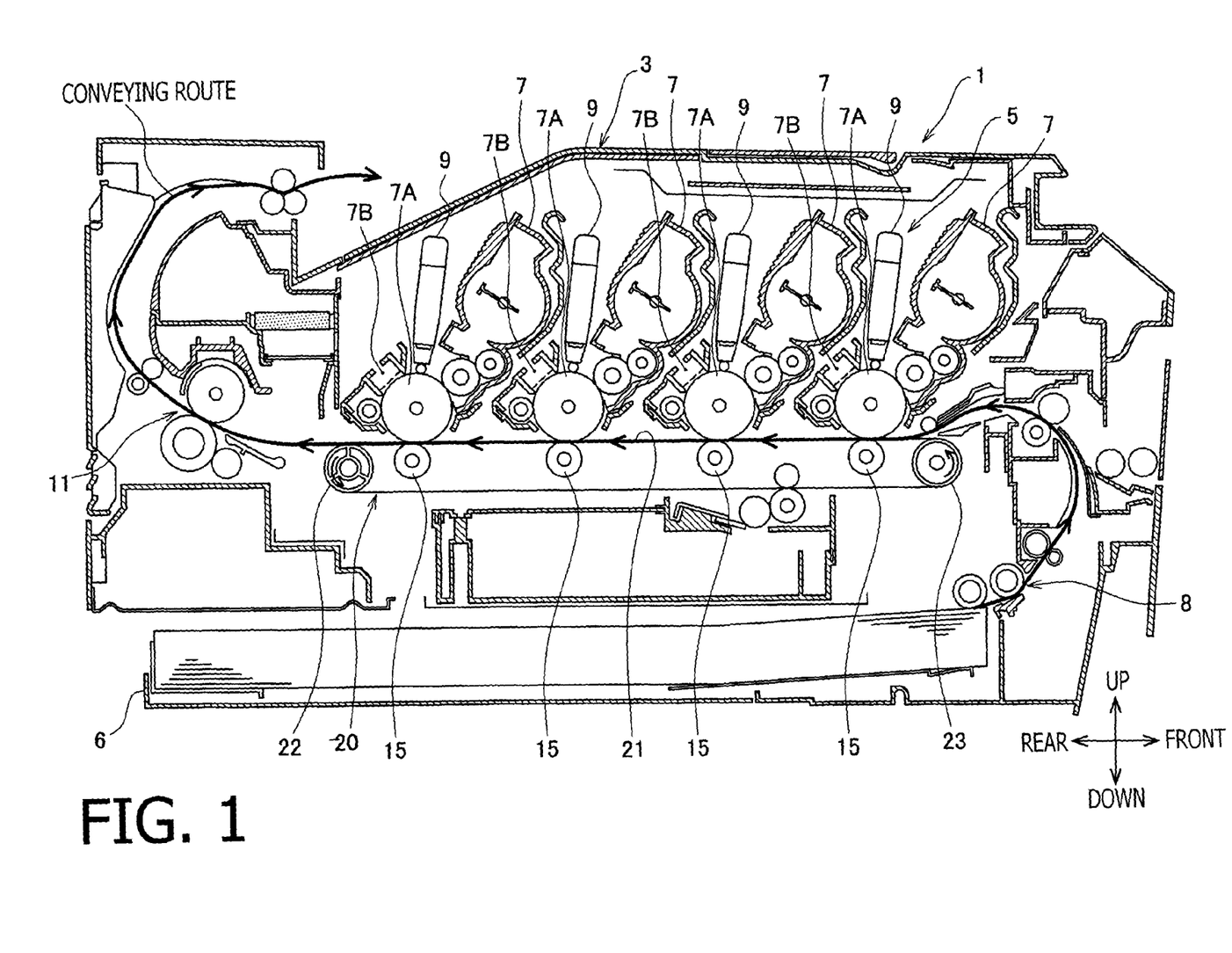
FIG. 1 is a cross-sectional side view of an image forming apparatus 1 according to an embodiment of the present invention.

An overall configuration of an image forming apparatus 1 according to the embodiment will be described with reference to FIG. 1. The image forming apparatus 1 being a multicolor electro-photographic image forming apparatus includes a chassis 3, which accommodates an image forming unit 5 inside. The image forming unit 5 is configured to transfer an image on a sheet (unsigned) of recording paper in an electro-photographic method. The image forming unit 5 includes a processing unit 7, an exposure unit 9, and a fixing unit 11.

The image forming apparatus 5 is a direct tandem-typed image forming unit, in which a plurality of (e.g., four) processing units 7 align along a sheet conveying route.

Each of the processing units 7 contains a developer agent therein, and colors of the developer agents are different from one another. Other than the colors of the contained developer agents, the processing units 7 are configured identically to one another. Each processing unit 7 includes a photosensitive drum 7A, on which an image in the developer agent is formed, and a charger 7B to electrically charge the photosensitive drum 7A.

In a position opposite from the photosensitive drums 7A, across an upper part of a transfer belt 21, a transfer unit 15 is disposed. The transfer units 15 transfer the developer agents carried on the photosensitive drums 7A to the sheet. The developer agents carried on the photosensitive drums 7A are transferred to the sheet while the sheet is conveyed on the transfer belt 21 and heated by the fixing unit 11 to be fixed on the sheet.

A feeder tray 6 is disposed in a lower position with respect to a belt unit 20. The feeder tray 6 accommodates stacked sheets therein, and the sheets are picked up and conveyed one-by-one toward the image forming unit 5 by a feeder unit 8. The feeder tray 6 is removable from the image forming apparatus 1.

2. Belt Unit 2.1 Configuration of the Belt Unit

Figure 2:
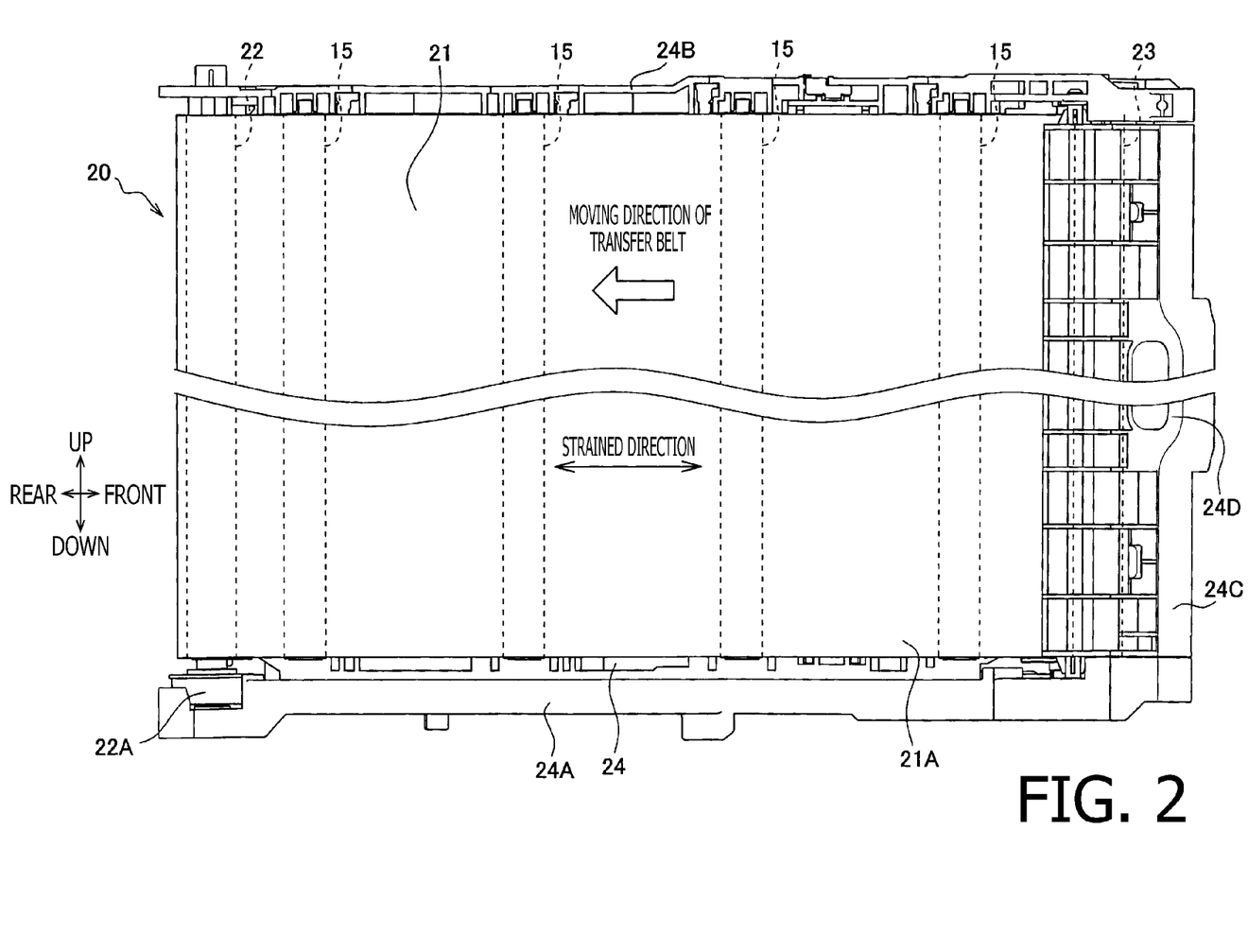
FIG. 2 is a top plan view of a belt unit 20 of the image forming apparatus 1 according to the embodiment of the present invention.

As shown in FIG. 2, the belt unit 20 includes the transfer belt 21, a driving roller 22, a driven roller 23, and a frame assembly 24 to hold the driving roller 22 and the driven roller 23.

The transfer belt 21 is an endless belt strip arranged in a strained condition to roll around the driving roller 22 and the driven roller 23 along with rotation of the driving roller 22 and the driven roller 23. The driving roller 22 is a roller to circulate the transfer belt 21, and the driven roller 23 is rotated by the driving roller 22 along with the circulation of the transfer belt 21. The endless belt denotes a belt which has no end along a rolling direction and can be circulated around the rollers endlessly.

The frame assembly 24 includes lateral frames 24A, 24B, which are arranged on axial-end (left and right) sides along an axial direction of the driving roller 22 to extend in parallel with a strained direction of the transfer belt 21. The strained direction denotes a direction of tensile force, which is produced in a strained part 21A of the transfer belt 21 when the transfer belt 21 is installed in the frame assembly 24. The strained part 21A denotes a surface of the transfer belt 21 which faces the photosensitive drums 7A when the belt unit 20 is installed in the image forming apparatus 1. In the present embodiment, the axial direction coincides with a widthwise (right-left) direction of the image forming apparatus 1 and includes a direction of an axis of the driving roller 22 and a direction of an axis of the driven roller 23. Meanwhile, an axial-end side along the axial direction denotes an area closer to an axial end of the driving roller 22 or the driven roller 23 with respect to a widthwise center of image forming apparatus 1 along the axial direction. In the following description, one of the axial-end sides denotes a left-hand side along the axial direction with respect to the widthwise center, and the other of the axial-end sides denotes a right-hand side along the axial direction with respect to the widthwise center.

Figure 3:
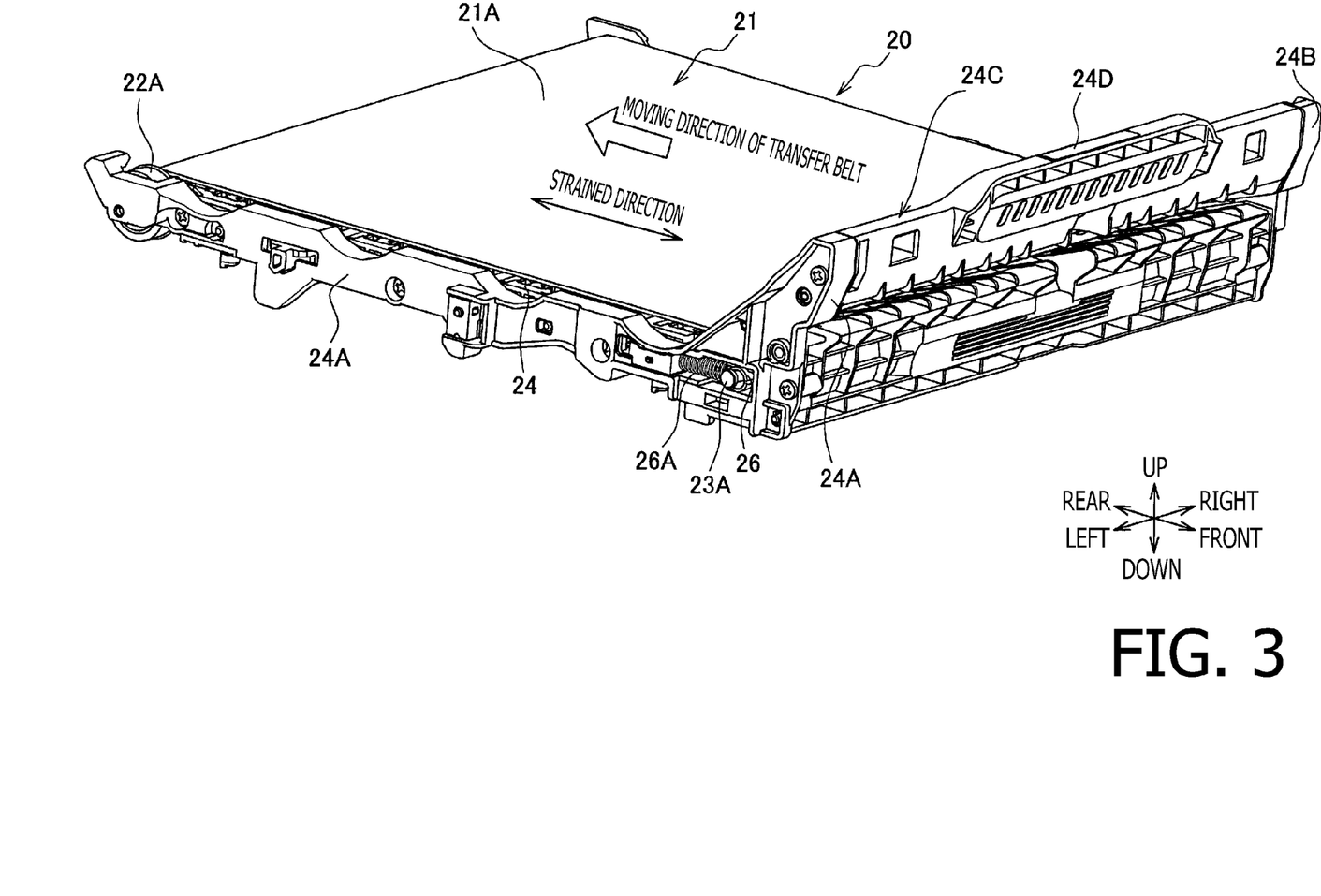
FIG. 3 is a perspective view of the belt unit 20 in the image forming apparatus 1 according to the embodiment of the present invention.

As shown in FIG. 3, the lateral frames 24A, 24B are fixed in the frame assembly 24 by a fastening means such as screws (unsigned). On one of longitudinal ends of the lateral frame 24A closer to the driven roller 23 and on one of longitudinal ends of the lateral frame 24B closer to the driven roller 23, a gripper frame 24C is attached. The gripper frame 24C extends along the axial direction to bridge between the lateral frames 24A, 24B.

The gripper frame 24C includes a gripper 24D, by which the belt unit 20 is gripped, while the belt unit 20 is detachably attached to a main frame (not shown) in the chassis 3 of the image forming apparatus 1. A user of the image forming apparatus 1 may grip onto the gripper 24D when the user attaches and removes the belt unit 20 to and from the image forming apparatus 1.

The main frame 30 of the image forming apparatus 1 includes a paired frames, which are arranged on both axial (right and left) sides of the chassis 3 along the axial direction. Therefore, the belt unit 20 is installed in the image forming apparatus 1 to bridge between the paired main frame 30 on the right and left sides along the axial direction. In the following description, unless otherwise noted, "the main frame 30" denotes one of the paired main frames 30 closer to the lateral frame 24A.

The driving roller 22 is rotatably held by the lateral frames 24A, 24B at axial ends thereof in a fixed position with respect to the lateral frames 24A, 24B. A roller gear 22A (see FIG. 2), which rotates along with the driving roller 22, is arranged on one of the axial-end sides of the driving roller 22 along the direction.

Meanwhile, on the main frame 30, a driving gear (not shown) is arranged. The driving gear is engaged with the roller gear 22A and supplies driving force to the driving roller 22. The driving gear is rotated by rotating force supplied from an electric motor (not shown).

The driven roller 23 is rotatably held by the lateral frames 24A, 24B at axial ends thereof and is movable in the strained direction. In other words, as shown in FIG. 3, shafts 24A of the driven roller 23 are rotatably held in shaft supports 26 at the axial ends thereof. The shaft supports 26 are attached to the lateral frames 24A, 24B and movable in the strained direction.

On each of the lateral frames 24A, 24B, a resilient member 26A is arranged. The resilient member 26A provides resilient force, which is in a direction from the driving roller 22 toward the driven roller 23, and applies the resilient force to the shaft support 26. Thus, the driven roller 23 generates predetermined intension of tensile force in the strained part 21A.

Figure 4:
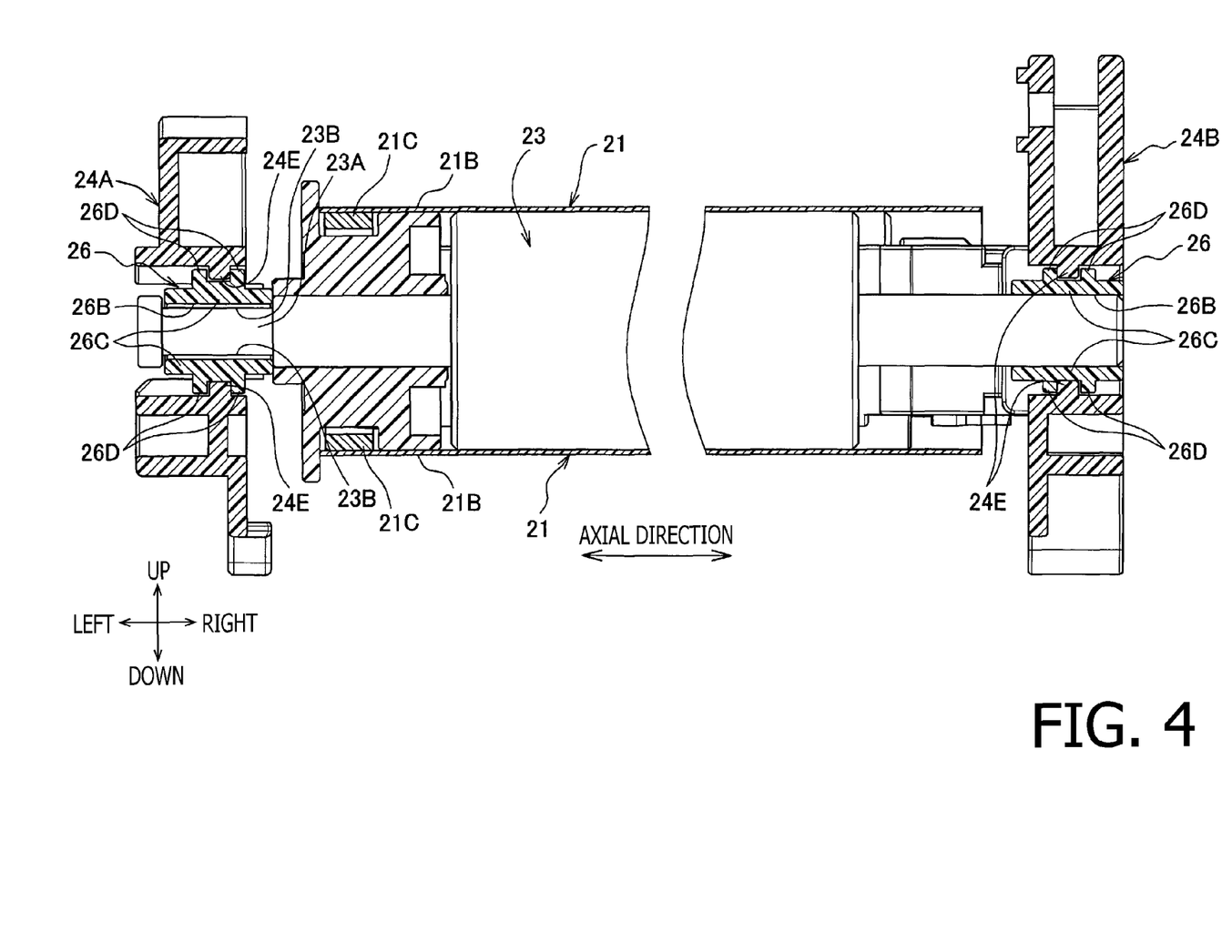
FIG. 4 is a cross-sectional view of a structure including a driven roller 23 in the belt unit 20 according to the embodiment of the present invention.

The shaft support 26 includes, as shown in FIG. 4, a tubular section 26C, in which a shaft hole 26B is formed, and a positioning section 26D, which is formed on an outer circumference of the tubular section 26C. The positioning section 26D is formed to have protrusions, and in between the protrusions along the axial direction, a rail 24E is interposed.

The rail 24E is formed in each of the lateral frames 24A, 24B. The rail 24E is a linearly formed protrusion extending along the strained direction, and the positioning section 26D having the paired protrusions is in slidably contact with lateral faces of the rail 24E. The lateral faces of the rail 24E refer to surfaces which are orthogonal to the axial direction. With the rail 24E slidably interposed in between the protrusions of the positioning section 26D, the shaft support 26 is placed in a correct position in the axial direction with respect to the lateral frames 24A, 24B.

The driven roller 23 is formed to be smaller in a diameter at a dent 23B, which dents inward along an entire outer circumference of the driven roller 23. The dent 23B is formed in a shaft of the driven roller 23 on one of the axial-end sides with the lateral frame 24A (e.g., the left-hand side). The dent 23B is slidably in contact with an inner circumference of the tubular section 26C in the shaft hole 26B.

The dent 23B is an inwardly-dented groove, which is formed to have a cross-sectional shape of a three-sided concave having lateral faces 23C at both sides along the axial direction and a bottom surface 23D on a level closer to a central axis L1. While the inner circumference of the tubular section 26C is in slidably contact with the bottom surface 23D, the shaft 23A is rotatably supported by the shaft support 26.

While an end 26E of the tubular section 26C along the axial direction is in slidably contact with the lateral face 23C of the dent 23B, the shaft 23A is placed in a correct position in the axial direction with respect to the shaft support 26. In other words, the dent 23B defines a correct position of the driven roller 23 in the axial direction with respect to the shaft support 26.

Further, the position of the shaft support 26 with respect to the lateral frame 24A along the axial direction is defined by the positioning section 26D. Thus, the dent 23B serves to place the driven roller 23 in the correct position in the axial direction with respect to the lateral frame 24A. In other words, the position of the driven roller 23 in the axial direction is defined with reference to the lateral frame 24A.

Meanwhile, the transfer belt 21 includes a guided part 21C, which protrudes inwardly from a belt strip 21B, in a position corresponding to one of axial-end sides (e.g., a left-hand side) of the belt strip 21B. More specifically, the guided part 21C is a linearly-formed protrusion extending in the strained direction at a widthwise end (e.g., a leftward) position along an inner circumferential surface of the belt strip 21B.

In this regard, the inner circumferential surface of the belt strip 21B refers to a surface, which contacts the driven roller 23. On the other hand, an outer circumferential surface of the belt strip 21B refers to an opposite side of the belt strip 21B from the inner peripheral surface.

The belt strip 21B in the present embodiment is made of a resin in a polyamide series, while the guided section 21C is made of a resin in an urethane series. The belt strip 21B and the guided section 21C are attached to each other by an adhesive agent in a modified silicone series.

In the belt unit 20, a guiding member 27 is arranged on the one of axial-end sides (e.g., a left hand side) of the driven roller 23 along the axial direction. The guiding member 27 is rotatable about the central axis L1 and is formed to have a groove 27A. With the guided section 21C of the transfer belt 21 set in the groove 27A, the transfer belt 21 is restricted from moving in the axial direction.

Meanwhile, the belt strip 21B does not have a guided section 21C in a position corresponding to the other one of axial-end sides (e.g., the right hand side) thereof. In other words, there is no guided section 21C on the other side of the belt strip 21B along the widthwise direction. Therefore, there is no guiding member 27 on the other one of axial-end sides of the driven roller 23.

More specifically, the guided section 21C is arranged in a displaced position with respect to the one of the widthwise ends (e.g., the left side end) of the belt strip 21B toward the other one of the widthwise ends (e.g., rightward). Accordingly, the belt strip 21B has a jut 21D (see FIG. 5), which protrudes leftward with respect to the guided piece 12C, on the left hand side along the widthwise direction.

2.2 Structure of the Guiding Member

Figure 5:
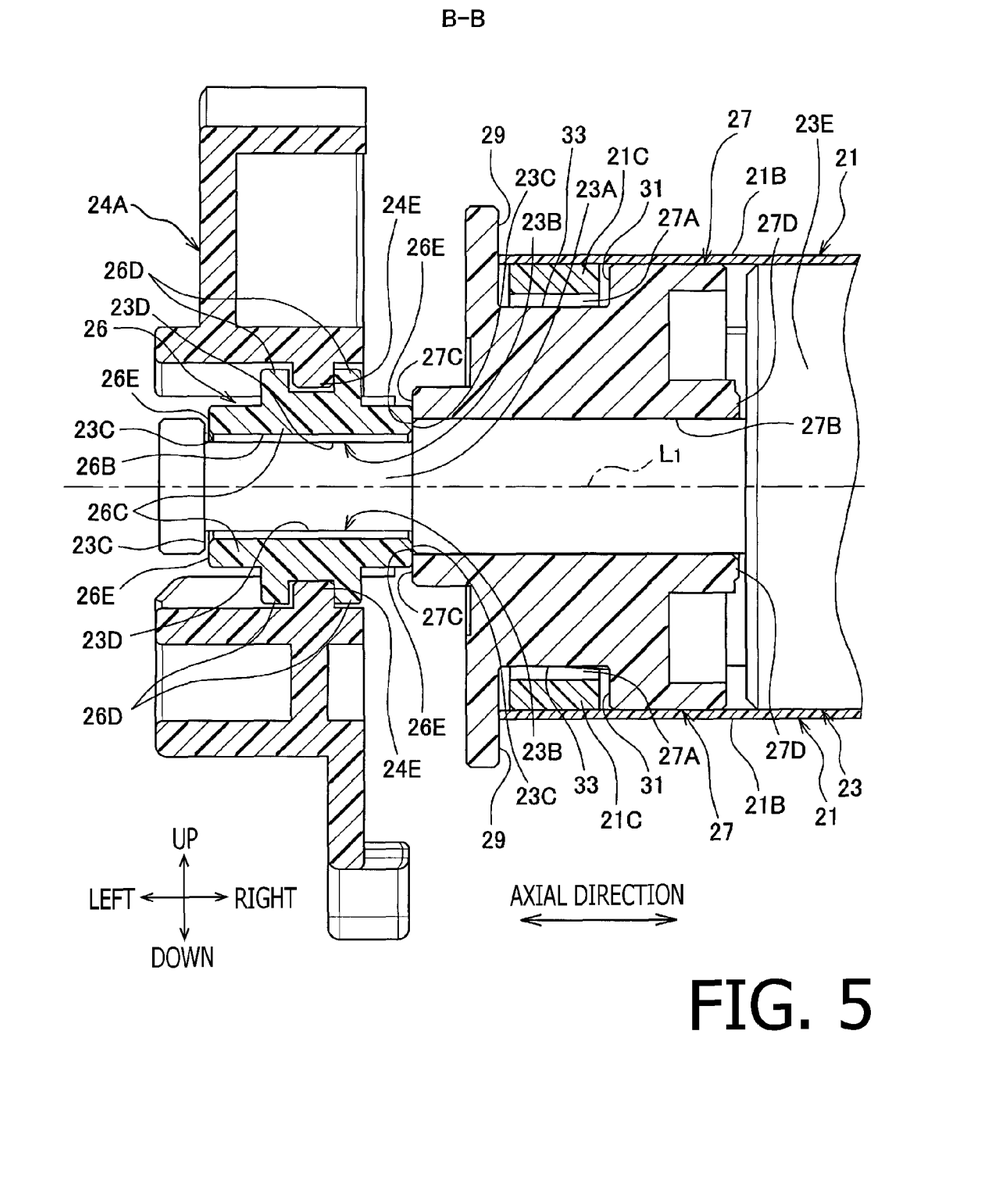
FIG. 5 is a cross-sectional view of an axial end area of the driven roller 23 in the belt unit 20 according to the embodiment of the present invention.

The groove 27A in the guiding member 27 is formed in a circular shape to circle about the central axis L1 (see FIG. 5). In particular, the groove 27A has a cross-sectional shape of three-sided concave groove having a first face 29, a second face 31, and a bottom surface 33.

The first face 29 and the second face 31 are in positions to face each other along a direction in parallel with the central axis L1 and form annular planes in shapes of disks, which expand in parallel with each other. The bottom surface 33B forms an annular surface which connects one end of the first face 29 closer to the central axis L1 and one end of the second face 31 closer to the central axis L1. The first face 29 refers to a surface on an outer side closer to the one of widthwise ends with respect to the second face 31 along the direction in parallel with the central axis L1, i.e., the widthwise direction.

An outer circumferential end of the first face 29 protrudes toward an outer side with respect to the inner circumferential surface of the belt strip 21B and extends outwardly beyond the outer circumferential surface of the belt strip 21B. A height of the protrusion of the first face 29 is greater than or equal to a sum of a thickness of the belt strip 21B and a height of the guided section 21C.

The guiding member 27 is formed to have a through hole 27B (see FIGS. 6A and 6B), which penetrates through the guiding member 27 along the central axis L1. An inner circumference of the through hole 27B serves as a bearing, by which the guiding member 27 is rotatably supported on the shaft 23A of the driven roller 23. In the following description, the through hole 27B may be referred to as a bearing 27B.

The bearing 27B is a slide bearing, which is slidably in contact with an outer circumference of the shaft 23A. Thus, the guiding member 27 is movable in the axial direction and rotatable about the central axis L1 independently from the driven roller 23.

In the guiding member 27, a first restricting section 27C is formed in a position to face the shaft support 26. As shown in FIG. 5, the first restricting section 27C contacts the shaft support 26 when the guiding member 27 is moved to the shaft support 26 and restricts the guiding member 27 from being moved further beyond a predetermined dimension toward the one of the axial ends (e.g., the leftward end) of the driven roller 23.

Meanwhile, in the guiding member 27, a second restricting section 27D is formed in a position to face the driven roller 23. The second restricting section 27D contacts a roller body 23E of the driven roller 23 when the guiding member 27 is moved to the roller body 23E and restricts the guiding member 27 from being moved further beyond toward the other one of the axial ends (e.g., the rightward end) of the driven roller 23. The roller body 23E of the driven roller 23 refers to a cylindrical part, which contacts the belt strip 21B, in the driven roller 23.

Thus, the guiding member 27 is interposed in a position between the shaft support 26 and the roller body 23E of the driven roller 23 in the axial direction. When the first restricting section 27C contacts the cylinder 26C of the shaft support 26, and the second restricting section 27D contacts the roller body 23E, a position of the guiding member 27 in the axial direction is defined.

Figure 7:
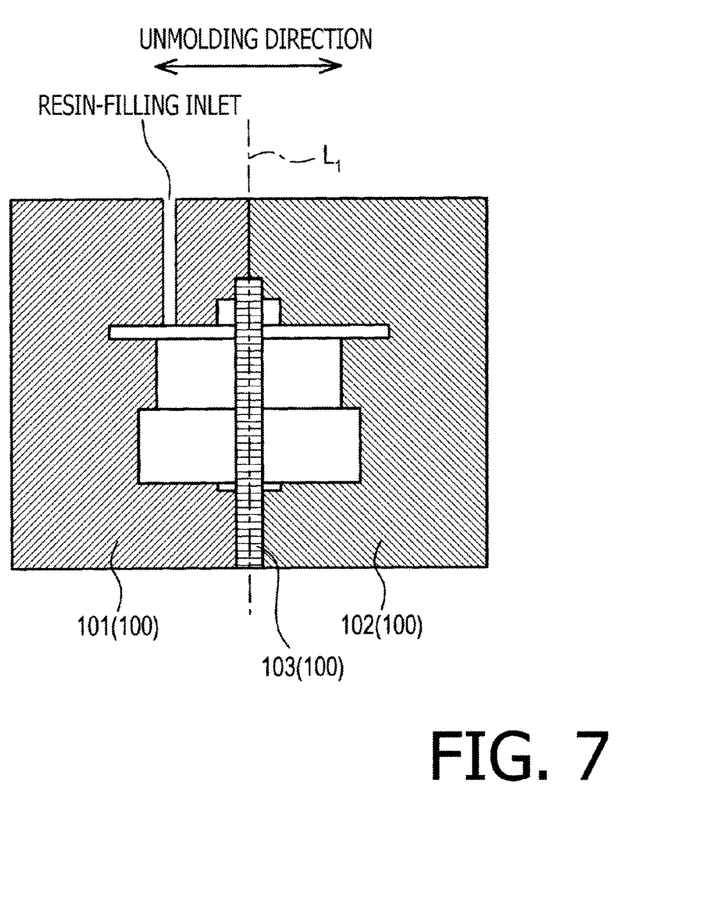
FIG. 7 is an illustrative view of mold patterns 100 for the belt unit 20 according to the embodiment of the present invention.

The guiding member 27 is a molded piece of resin formed integrally with the first face 29 and the second face 31. A mold 100 to form the guiding member 27 includes, as shown in FIG. 7, a first mold pattern 101, a second mold pattern 102, and a core 103.

The first mold pattern 101 and the second mold pattern 102 are pattern pieces to form an external shape of the guiding member 27. The core 103 is a pattern piece to form the through hole 27B. An unmolding direction of the first mold pattern 101 and the second mold pattern 102 is orthogonal with respect to the central axis L1.

With these mold patterns, in the first face 29 of the guiding member 27, in a position corresponding to divided faces of the mold 100, a first parting line PL1 (see FIG. 6B), which lies in a direction intersecting with the central axis L1, is formed. Similarly, in a position corresponding to the second face 31 corresponding to the divided faces of the mold 100, a second parting line PL2 (see FIG. 6A), which lies in a direction intersecting with the central axis L1, is formed.

In this regard, the divided faces of the mold 100 denotes matching edges of the first mold pattern and the second mold pattern 102 to meet and contact each other when the mold 100 is formed. As shown in FIG. 7, the matching edges of the first mold pattern 101 and the second mold pattern 102 are flat. Therefore, the first parting line PL1 and the second parting line PL2 are formed to lie in parallel with each other.

Each of the first parting line PL1 and the second parting line PL2 includes two lines, which are formed in point-symmetrical positions with respect to the central axis L1.

Figure 6A:
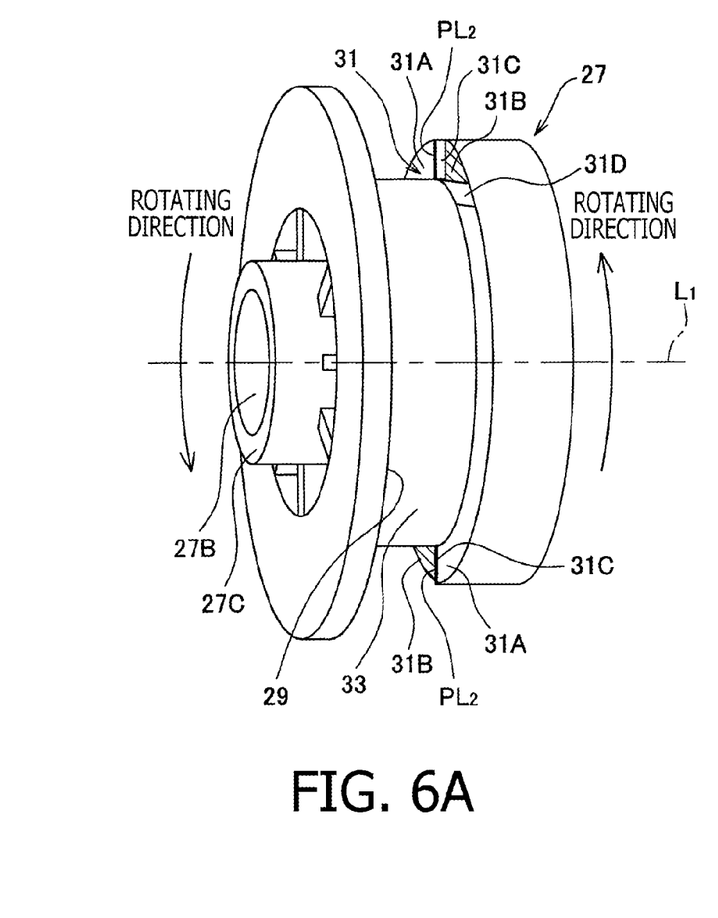
FIGS. 6A and 6B are perspective views of the guiding member 27 in the belt unit 20 according to the embodiment of the present invention.
Figure 6B:
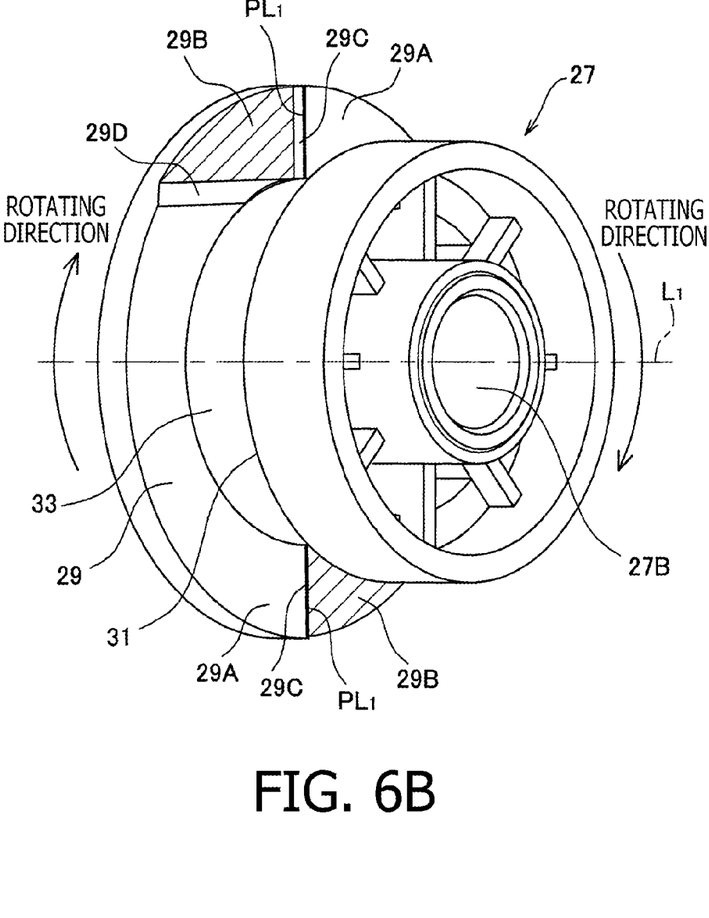

According to the present embodiment, as shown in FIG. 6B, the first face 29 includes first parts 29A and second parts 29B. The first parts 29A lie in frontward positions with respect to the first parting line PL1 along a rotating direction of the guiding member 27, and the second parts 29B lie in rearward positions with respect to the parting line PL1 along the rotating direction of the guiding member 27. The second parts 29B are indicated in shading in FIG. 6B.

Similarly, as shown in FIG. 6A, the second face 31 includes third parts 31A and fourth parts 31B. The third parts 31A lie in frontward positions with respect to the second parting line PL2 along the rotating direction of the guiding member 27, and the third parts 31B lie in rearward positions with respect to the parting line PL2 along the rotating direction of the guiding member 27. The fourth parts 31B are indicated in shading in FIG. 6A.

Further, on the first face 29, as shown in FIG. 6B, the first part 29A is formed on a plane closer to the second face 31 with respect to a plane of the second part 29B, and a first gap 29C is formed in between the different-leveled first part 29A and the second part 29B. Similarly, on the second face 31, as shown in FIG. 6A, the third part 31A is formed on a plane closer to the first face 29 with respect to a plane of the fourth part 31B, and a second gap 31C is formed in between the different-leveled third part 31A and the fourth part 31B.

While the first parting line PL1 and the second parting line PL2 respectively are formed in point-symmetrical positions with respect to the central axis L1 on the first face 29 and the second face 31, there are two first gaps 29C and two second gaps 31C on the first face 29 and the second face 31 respectively. The two first gaps 29C and the two second gaps 31C are formed in point-symmetrical positions with respect to the central axis L1 respectively.

Figure 8A:
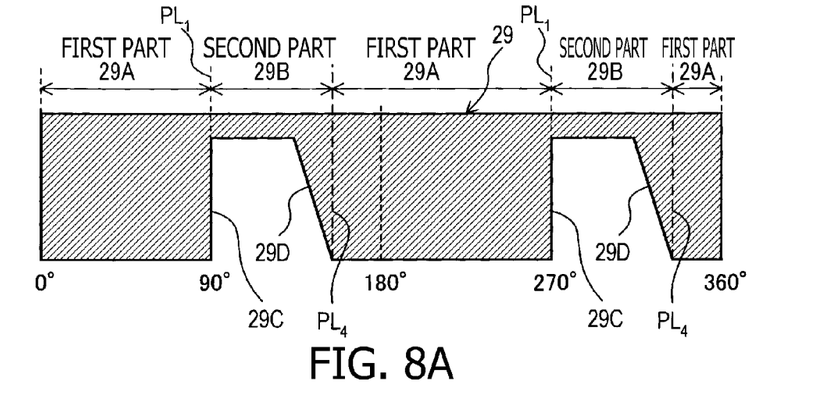
FIG. 8A is a stretched plain view of a circumference of a first face 29 in the guiding member 27 in the belt unit 20 according to the embodiment of the present invention.
Figure 8B:
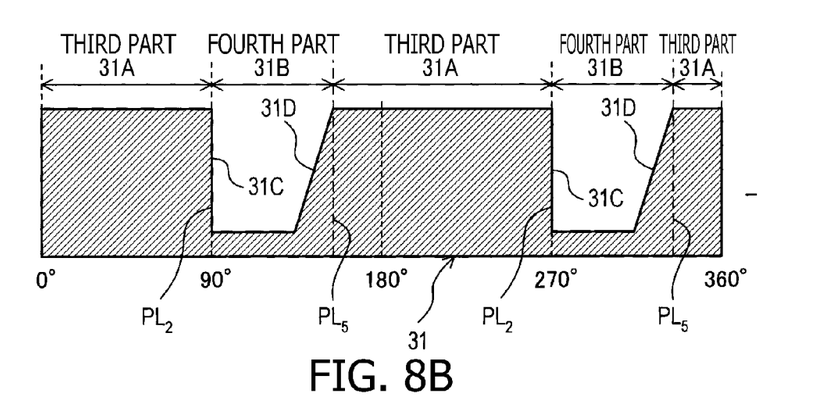
FIG. 8B is a stretched plain view of a circumference of a second face 31 in the guiding member 27 in the belt unit 20 according to the embodiment of the present invention.

Thus, as shown in FIG. 8A, on the first face 29, the first gaps 29C are formed on the first parting lines PL1. Similarly, as shown in FIG. 8B, on the second face 31, the second gaps 31C are formed on the second parting lines PL2. A dimension (depth) of the first gap 29C and the second gap 31C between the first part 29A and the second part 29B and between the third part 31A and the fourth part 31B respectively may be, for example, 40-50 micrometers.

Figure 8C:
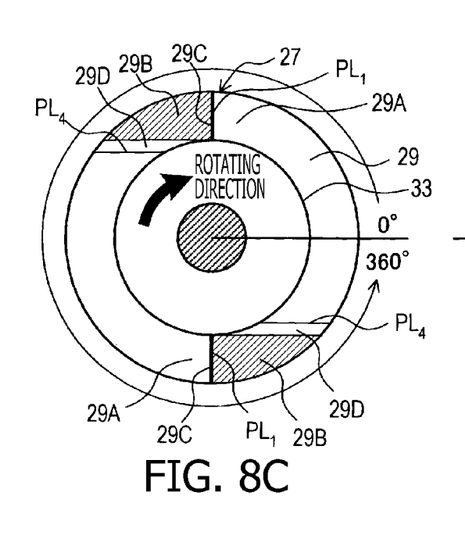
FIG. 8C is a plane view of the first face 29 in the guiding member 27 in the belt unit 20 according to the embodiment of the present invention.

FIG. 8A is a stretched view of the first face 29 viewed around along the outer circumference from 0 degrees to 360 degrees as shown in FIG. 8C. FIG. 8B is a stretched view of the second face 31 viewed around along the outer circumference from 0 degrees to 360 degrees as shown in FIG. 8D.

As shown in FIG. 8C, the second part 29B on the first face 29 is formed in a range between the first parting line PL1 and a first unmolding line PL4. More specifically, the second part 29B starts from the first parting line PL1 and stretches rearward along the rotating direction of the guiding member 27 to reach the first unmolding line PL4. The first unmolding line PL4 denotes a virtual line, which traces orthogonally with respect to the central axis L1 and in a direction to intersect with the first parting line PL1, on the first face 29. In the present embodiment, in particular, the first unmolding line PL4 coincides with a direction of a line tangent to an intersection between the bottom surface 33 and the first parting line PL1.

Figure 8D:
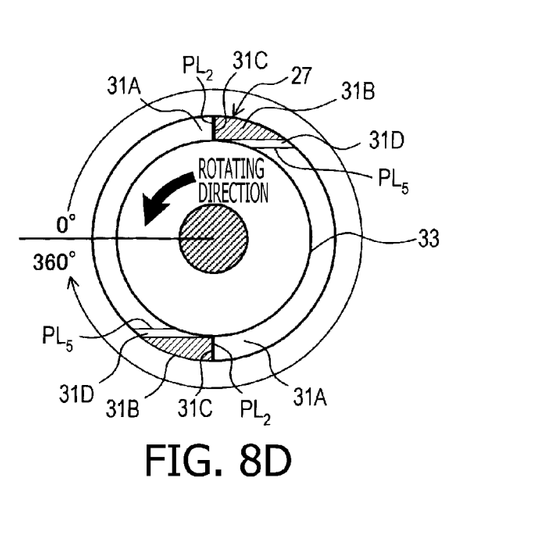
FIG. 8D is a plane view of the second face 31 in the guiding member 27 in the belt unit 20 according to the embodiment of the present invention.

Similarly, as shown in FIG. 8D, the fourth part 31B on the second face 31 is formed in a range between the second parting line PL2 and a second unmolding line PL5. More specifically, the fourth part 31B starts from the second parting line PL2 and stretches rearward along the rotating direction of the guiding member 27 to reach the second unmolding line PL5. The second unmolding line PL5 denotes a virtual line, which traces orthogonally with respect to the central axis L1 and in a direction to intersect with the second parting line PL2, on the second face 31. In the present embodiment, in particular, the second unmolding line PL5 coincides with a direction of a line tangent to an intersection between the bottom surface 33 and the second parting line PL2.

According to the present embodiment, the first unmolding line PL4 and the second unmolding line PL5 are virtual lines traced in parallel with the unmolding direction. Therefore, the first unmolding line PL4 and the second unmolding line PL5 are parallel with each other.

In the second part 29B, an inclined surface 29D (see FIGS. 8A and 8C), which inclines with respect to a virtual plane extending orthogonally to the central axis L1, is formed in at least one of a frontward range and a rearward range within the second part 29B along the rotating direction of the guiding member 27. In the present embodiment, the inclined surface 29D is formed solely in the rearward range in the second part 29B.

Similarly, in the fourth part 31B, an inclined surface 31D, which inclines with respect to the virtual plane extending orthogonally to the central axis L1, is formed in at least one of a frontward range and a rearward range within the fourth part 31B along the rotating direction of the guiding member 27. In the present embodiment, the inclined surface 29D is formed solely in the rearward range in the fourth part 31B.

While the first unmolding line PL4 and the second unmolding line PL5 trace in parallel with each other and with the unmolding direction, the inclined surface 29D and the inclined surface 31D are formed on planes stretching in parallel with the unmolding direction.

3. Features of the Image Forming Apparatus According to the Present Embodiment

Figure 9A:
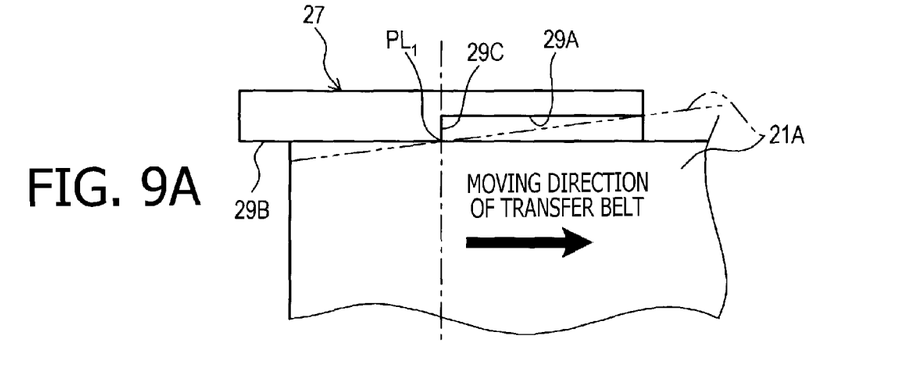
FIGS. 9A-9C illustrate behaviors of the guiding member 27 and a transfer belt 21 in the belt unit 20 according to the embodiment of the present invention.
Figure 9B:
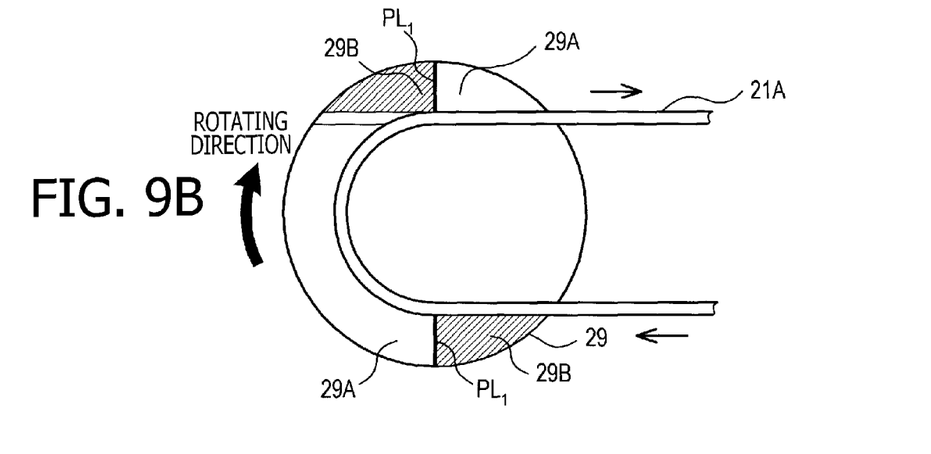

Unlike the guiding member 27 described above, if the first part 29A is formed on a plane farther from the second face 31 with respect to the second part 29B, as shown in FIGS. 9A and 9B, the second part 29B should protrude toward the strained part 21A of the transfer belt 21 with respect to the first part 29A. FIG. 9A is a top plane view of such a guiding member 27 and the transfer belt 21 shown in FIG. 9B. Therefore, when the transfer belt 21 drifts toward the first face 29, the transfer belt 21 may contact the first part 29A as indicated by a double-dotted chain line in FIG. 9A.

Figure 9C:
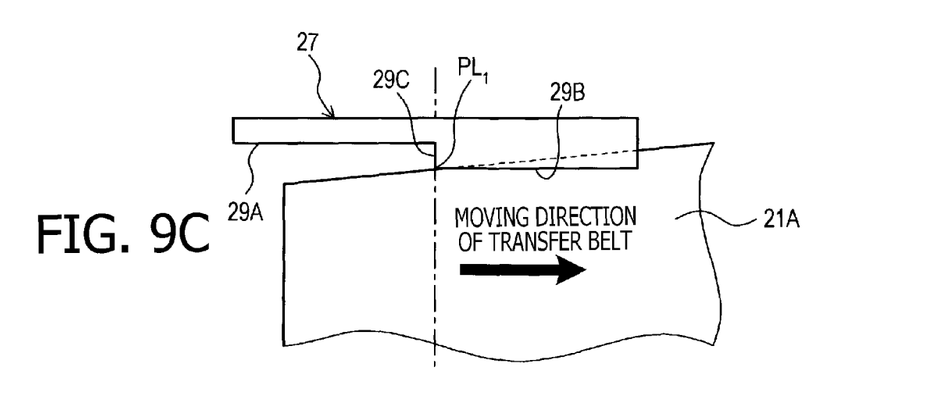

As the guiding member 27 rotates, the strained part 21A of the transfer belt 21, which was previously in the condition to contact the first part 24A, now comes in a condition to contact the second part 29B, as shown in FIG. 9C. In this condition, the second part 29B and the first gap 29C may collide with the outer circumference (e.g., the upper surface) of the strained part 21A. In other words, the strained part 21A may be hit by the second part 29B and the first gap 29C.

Thus, if the first part 29A is retracted from the second part 29B to be apart from the second face 31, the second part 29B may collide with the strained part 21A periodically, and the transfer belt 21 may be damaged in an earlier life stage thereof On the contrary, according to the present embodiment, the first part 29A is formed in the position closer to the second face 31 with respect to the second part 29B; therefore, the second part 29B does not protrude toward the strained part 21A of the transfer belt 21, and the second part 21B is secured from the collision with the strained part 21A. Accordingly, the second part 21B is prevented from being collided with the strained part 21A periodically, and the transfer belt 21 may be prevented from being damaged in the earlier life stage.

Further, according to the present embodiment, the first face 29 is formed to have the inclined surface 29D. Thus, a boundary area between the first part 29A and the second part 29B is prevented from forming an abrupt edge, which may otherwise damage the widthwise end of the belt strip 21B. Therefore, the belt strip 21B can be prevented from being damaged in an earlier life stage.

Furthermore, the second face 31 is formed to have the inclined surface 31D. Thus, a boundary area between the third part 31A and the fourth part 31B is prevented from forming an abrupt edge, which may otherwise damage the widthwise end of the belt strip 21B. Therefore, the belt strip 21B can be prevented from being damaged in an earlier life stage.

In the present embodiment, the belt strip 21B is made of the resin in the polyamide series. While the resin in the polyamide series is easily deformable, there may be a case that the transfer belt 21 rides over the first face 29 easily. Therefore, when the belt strip 21B is made of the resin in the polyamide series as it is in the present embodiment, it is preferable that first face 29 prevents the belt strip 21B from riding over.

More Examples

Although an example of carrying out the invention has been described, those skilled in the art will appreciate that there are numerous variations and permutations of the belt unit and the image forming apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the guided section 21C may not necessarily be an endless strip of protrusion, which is continuously arranged on the inner peripheral surface of the belt strip 21B. For example, a toothed belt, on which smaller protrusions are intermittently arranged, may be employed.

For another example, the first face 29 may not necessarily protrude outwardly with respect to the outer circumferential surface of the belt strip 21B as long as the first face 29 protrudes outwardly with respect to the inner circumferential surface of the belt strip 21B.

For another example, the inclined surfaces 29D, 31D may not necessarily be formed solely in the rearward ranges in the second part 29B and the fourth part 31B respectively. For example, the inclined surfaces 29D, 31D may be formed solely in the frontward ranges in the second part 29B and the fourth part 31B respectively. For another example, the inclined surfaces 29D, 31D may be formed in both the frontward ranges and the rearward ranges in the second part 29B and the fourth part 31B respectively.

For another example, the belt strip 21B may not necessarily be made of the resin in the polyamide series but may be made of a different material.

For another example, the guiding member 27 may not necessarily be rotatable independently from the driven roller 23 but may be rotatable integrally along with the driven roller 23. Alternatively, the driven roller 23 may be formed to have the groove 27A.

For another example, the guiding member 27 may not necessarily be attached to the driven roller 23 but may be attached to the driving roller 22. For another example, one or more additional rollers may be provided in addition to the driving roller 22 and the driven roller 23, and the guiding member 27 may be attached to one of those three or more rollers.

For another example, the present invention may not necessarily be applied to the direct-typed image forming apparatus but may be similarly applied to an intermediate transfer-typed image forming apparatus.

For another example, the exposure unit 9 provided to each of the photosensitive drums 7A may not necessarily be equipped with the plurality of LEDs aligned along the axial direction of the photosensitive drum 7A. The exposure unit 9 may be a so-called scanner-typed exposure unit, in which a laser beam scans the circumference of the photosensitive drum 7A along the axial direction.

For another example, the groove 27A may not necessarily be formed to have the cross-sectional shape of three-sided concave but may be formed to have a cross-sectional shape of a "V" or a trapezoid.

For another example, the first piece 29 and the second piece 31 may not necessarily be formed in the dual-parted mold patterns, or may not necessarily be unmolded along the central axis L1.

What is claimed is:

1. A belt unit, comprising:
    an endless belt comprising a belt strip and a guided section, the guided section protruding from an inner circumferential surface of the belt strip at one of widthwise sides along a widthwise direction of the belt strip;
    a first roller and a second roller, around which the endless belt is strained; and
    a guiding member made of resin and arranged on one of axial-end sides of the first roller along an axial direction of the first roller coaxially with the first roller, the guiding member being rotatable and formed to have a groove, in which the guided section is set,
    wherein the groove comprises a first face and a second face, which face each other along a direction of a central axis, and a bottom surface, which extends in the direction of the central axis and forms an annular surface connecting one end of the first face closest to the central axis and one end of the second face closest to the central axis,
    wherein the first face of the groove is arranged in a position closer to the one of widthwise sides with respect to the second face along the direction of the central axis and is formed to have a first parting line extending in a direction to intersect with the central axis, the first face comprising a first part in a frontward range with respect to the first parting line along a rotating direction of the guiding member and a second part in a rearward range with respect to the first parting line along the rotating direction of the guiding member, and the first face being formed to have a first gap between the first part and the second part to form the first part in a position closer to the second face with respect to the second part,
    wherein the first face comprises a first unmolding line, which extends in a direction of a line tangent to an intersection between the bottom surface and the first parting line,
    wherein the second part is formed in a range extending from the first parting line rearward along the rotating direction of the guiding member to reach the first unmolding line, and
    wherein the second part comprises an inclined surface, which extends in a direction of the first unmolding line, one of edges of the inclined surface being coincident with the first unmolding line.

2. The belt unit according to claim 1,
    wherein the second face is formed to have a second parting line extending orthogonally with respect to the central axis,
    wherein second face comprises a third part in a frontward range with respect to the second parting line along the rotating direction of the guiding member and a fourth part in a rearward range with respect to the second parting line along the rotating direction of the guiding member,
    wherein the second face is formed to have a second gap between the third part and the fourth part to form the third part in a position closer to the first face with respect to the fourth part,
    wherein the second face comprises a second unmolding line, which extends in a direction of a line tangent to an intersection between the bottom surface and the second parting line, and
    wherein the fourth part is formed in a range extending from the second parting line rearward along the rotating direction of the guiding member to reach the second unmolding line.

3. The belt unit according to claim 2,
    wherein the fourth part comprises an inclined surface, which is formed to incline with respect to a virtual plane extending orthogonally to the central axis, in at least one of a frontward range and a rearward range within the fourth part along the rotating direction of the guiding member.

4. The belt unit according to claim 1,
    wherein the first gap includes at least two gaps formed in point-symmetrical positions with respect to the central axis.

5. The belt unit according to claim 1,
    wherein the guiding member is arranged solely on the one of axial-end sides of the first roller along the axial direction.

6. The belt unit according to claim 1,
    wherein the guided section is arranged in a displaced position with respect to the one of widthwise ends of the belt strip toward the other of the widthwise ends of the belt strip.

7. The belt unit according to claim 1, wherein and the bottom surface of the groove extends orthogonally to the first face, and
    wherein the first face is formed to spread orthogonally to the central axis from the bottom surface beyond the inner and outer circumferential surfaces of the belt strip.

8. The belt unit according to claim 1, wherein the first face is formed in a shape of a disk protruding outwardly with respect to an outer circumferential surface of the belt strip.

9. An image forming apparatus, comprising:
    an image forming unit configured to form an image on a sheet; and
    a belt unit comprising:
        an endless belt comprising a belt strip and a guided section, the guided section protruding from an inner circumferential surface of the belt strip at one of widthwise sides along a widthwise direction of the belt strip;
        a first roller and a second roller, around which the endless belt is strained; and
        a guiding member made of resin and arranged on one of axial-end sides of the first roller along an axial direction of the first roller coaxially with the first roller, the guiding member being rotatable and formed to have a groove, in which the guided section is set,
    wherein the groove comprises a first face and a second face, which face each other along a direction in parallel with a central axis, and a bottom surface, which extends in a direction of the central axis and forms an annular surface connecting one end of the first face closest to the central axis and one end of the second face closest to the central axis, and
    wherein the first face of the groove is arranged in a position closer to the one of widthwise sides with respect to the second face along the direction in parallel with the central axis and is formed to have a first parting line extending in a direction to intersect with the central axis, the first face comprising a first part in a frontward range with respect to the first parting line along a rotating direction of the guiding member and a second part in a rearward range with respect to the first parting line along the rotating direction of the guiding member, and the first face being formed to have a first gap between the first part and the second part to form the first part in a position closer to the second face with respect to the second part, wherein the first face comprises a first unmolding line, which extends in a direction of a line tangent to an intersection between the bottom surface and the first parting line, wherein the second part is formed in a range extending from the first parting line rearward along the rotating direction of the guiding member to reach the first unmolding line and wherein the second part comprises an inclined surface, which extends in a direction of the first unmolding line, one of edges of the inclined surface being coincident with the first unmolding line.

10. The image forming apparatus according to claim 9, wherein the first gap includes at least two gaps formed in point-symmetrical positions with respect to the central axis.

11. The image forming apparatus according to claim 9, wherein the bottom surface of the groove extends orthogonally to the first face, and
wherein the first face is formed to spread orthogonally to the central axis from the bottom surface beyond the inner and outer circumferential surfaces of the belt strip.

12. The image forming apparatus according to claim 9, wherein the first face is formed in a shape of a disk protruding outwardly with respect to an outer circumferential surface of the belt strip.

13. A method for forming a guiding member to be used in a belt unit, the belt unit comprising:

an endless belt comprising a belt strip and a guided section, the guided section protruding from an inner circumferential surface of the belt strip at one of widthwise sides along a widthwise direction of the belt strip;

a first roller and a second roller around which the endless belt is strained; and a guiding member made of resin and arranged on one of axial-end sides of the first roller along an axial direction of the first roller coaxially with the first roller, the guiding member being rotatable and formed to have a groove in which the guided section is set, wherein the groove comprises a first face and a second face which face each other along a direction parallel with a central axis, and a bottom surface, which extends in a direction of the central axis and forms an annular surface connecting one end of the first face closest to the central axis and one end of the second face closest to the central axis, wherein the first face of the groove is arranged at a position closer to the one of widthwise sides with respect to the second face along the direction parallel with the central axis and is formed to have a first parting line extending in a direction to intersect with the central axis, the first face comprising a first part in a frontward range with respect to the first parting line along a rotating direction of the guiding member and a second part in a rearward range with respect to the first parting line along the rotating direction of the guiding member, and the first face being formed to have a first gap between the first part and the second part to form the first part in a position closer to the second face with respect to the second part, wherein the first face comprises a first unmolding line, which extends in a direction of a line tangent to an intersection between the bottom surface and the first parting line, wherein the second part is formed in a range extending from the first parting line rearward along the rotating direction of the guiding member to reach the first unmolding line, wherein the guiding member is formed by molding with a mold which can be divided into mold patterns including a first mold pattern and a second mold pattern, wherein the first parting line is formed in a position corresponding to divided faces between the first mold pattern and the second mold pattern, and wherein the guiding member is unmolded from the mold pattern along a direction of the first unmolding line.

14. The method according to claim 13, wherein the first gap includes at least two gaps formed in point-symmetrical positions with respect to the central axis.

15. The method according to claim 13, wherein and the bottom surface of the groove extends orthogonally to the first face, and
wherein the first face is formed to spread orthogonally to the central axis from the bottom surface beyond the inner and outer circumferential surfaces of the belt strip.

16. The method according to claim 13, wherein the first face is formed in a shape of a disk protruding outwardly with respect to an outer circumferential surface of the belt strip.

17. The method according to claim 13, wherein the second part comprises an inclined surface, which extends in a direction of the first unmolding line, one of edges of the inclined surface being coincident with the first unmolding line.

* * * * *